United States Patent
Jiang et al.

(10) Patent No.: US 12,134,218 B2
(45) Date of Patent: Nov. 5, 2024

(54) METHOD OF FORMING COMPONENT USING METAL-RESIN COMPOSITE AND MOLD FOR FORMING SAID COMPONENT

(71) Applicant: NISSAN MOTOR CO., LTD., Yokohama (JP)

(72) Inventors: Zhe Jiang, Kanagawa (JP); Takashi Oda, Kanagawa (JP); Katsumi Morohoshi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/054,645

(22) PCT Filed: May 24, 2018

(86) PCT No.: PCT/JP2018/019999
§ 371 (c)(1),
(2) Date: Nov. 11, 2020

(87) PCT Pub. No.: WO2019/224977
PCT Pub. Date: Nov. 28, 2019

(65) Prior Publication Data
US 2021/0078222 A1    Mar. 18, 2021

(51) Int. Cl.
*B29C 45/14* (2006.01)
*B29C 33/16* (2006.01)
(Continued)

(52) U.S. Cl.
CPC .............. *B29C 45/14* (2013.01); *B29C 33/16* (2013.01); *B29C 33/18* (2013.01); *B29C 43/18* (2013.01)

(58) Field of Classification Search
CPC ................ B29C 64/209; B29C 45/561; B29C 45/14065; B29C 2045/14147;
(Continued)

(56) References Cited

U.S. PATENT DOCUMENTS 3,363,040 A    1/1968   Katashi
5,053,179 A   10/1991   Masui et al.
(Continued)

FOREIGN PATENT DOCUMENTS

DE    36 24 609 A1    2/1987
JP    56-104015 A    8/1981
(Continued)

OTHER PUBLICATIONS

Abe (English Translation of WO 95017290) (Year: 1995).*
Iizuka (English Translation of JP2004174925) (Year: 2004).*
Ogami (English Translation of JP5528781B2) (Year: 2014).*

*Primary Examiner* — Michael A Tolin
*Assistant Examiner* — Hana C Page
(74) *Attorney, Agent, or Firm* — Foley & Lardner LLP

(57) ABSTRACT

Provided is a method of molding, by using a mold, a component including a metal plate and a thermoplastic resin containing a thermoplastic resin arranged on a surface on one side of the metal plate, the mold including at least a movable mold and a fixed mold including a support portion. Specifically, the molding method includes: an arranging step of arranging a premolded metal plate within the mold; a fixing step of fixing the metal plate by pressing the metal plate against the movable mold with use of the support portion; and a molding step including forming a cavity between the fixed mold and the metal plate by closing the mold, bringing the thermoplastic resin into close contact with the metal plate, and forming an exposed portion by exposing the metal plate out of the softened thermoplastic resin with use of the support portion. With this, without leakage of the thermoplastic resin, a joint region to a metal surface of another component can be reliably secured.

12 Claims, 11 Drawing Sheets

(51) Int. Cl.
*B29C 33/18* (2006.01)
*B29C 43/18* (2006.01)

(58) Field of Classification Search
CPC .......... B29C 2045/14155; B29C 2045/14163; B29C 64/393; B29C 64/245
USPC ....................................................... 264/40.1
See application file for complete search history.

(56) References Cited

U.S. PATENT DOCUMENTS

| | | | | |
|---|---|---|---|---|
| 5,424,017 | A * | 6/1995 | Hinduja | B29C 67/246 264/328.7 |
| 8,383,242 | B2 | 2/2013 | Malek et al. | |
| 9,855,683 | B2 * | 1/2018 | Bosg | B29C 70/72 |
| 10,780,610 | B2 * | 9/2020 | Masaka | B29C 33/22 |
| 2008/0261471 | A1 | 10/2008 | Chen et al. | |
| 2011/0285058 | A1 * | 11/2011 | Kobayashi | B29C 45/561 264/328.7 |
| 2013/0082416 | A1 * | 4/2013 | Wakeman | B29C 33/14 264/259 |
| 2017/0129141 | A1 | 5/2017 | Masaka et al. | |
| 2018/0178424 | A1 * | 6/2018 | Faik | B29C 45/2606 |

FOREIGN PATENT DOCUMENTS

| | | | |
|---|---|---|---|
| JP | 61-125817 A | 6/1986 | |
| JP | 2008-284773 A | 11/2008 | |
| JP | 2010-120384 A | 6/2010 | |
| WO | WO-2008/152307 A2 | 12/2008 | |
| WO | WO-2009012313 A1 * | 1/2009 | ............ B29C 33/14 |
| WO | WO 2011/001809 A1 | 1/2011 | |
| WO | WO-2015/198722 A1 | 12/2015 | |

* cited by examiner

METHOD OF FORMING COMPONENT USING METAL-RESIN COMPOSITE AND MOLD FOR FORMING SAID COMPONENT

TECHNICAL FIELD

The present invention relates to a method of molding a component using a composite of a thermoplastic resin and a metal plate. More specifically, the present invention relates to a method of molding a component in which the thermoplastic resin and the metal plate are directly bonded to each other, and relates to a mold to be used in the molding method.

BACKGROUND ART

As automotive components, composites of a resin and a metal member have been used to reduce weight of vehicles. In many cases, adhesives have been used for bonding the resin and the metal member to each other.

Although various adhesives for bonding the resin and the metal member to each other have been developed, these adhesives are liable to crack and peel off. This is because the metal member and the resin are different from each other in thermal shrinkage rate, and hence residual shear stress is liable to be applied to the adhesives sandwiched between the metal member and the resin.

Patent Literature 1 discloses an automotive component formed by forming a plastics rib structure by injection moulding onto an interior metal thin plate having a surface that has been pretreated, bracketing the plastic rib structure with an exterior thin plate, and welding the interior thin plate and the exterior thin plate to each other.

CITATION LIST

Patent Document

Patent Document 1: Japanese Patent Application Laid-open No. 2010-120384

SUMMARY OF INVENTION

Technical Problem

However, thin metal plates are liable to be deformed due to their thickness, and hence their press molding with high accuracy is difficult. Meanwhile, when a premolded metal plate is arranged in a mold, gaps due to warps in the metal plate are formed between the metal plate and the mold.

Thus, in applying a resin to the metal plate arranged in the mold, the metal plate is liable to be moved and inclined in the mold by injection pressure and pressing pressure. Thus, it is difficult to apply the thermoplastic resin to a desired position on the metal plate.

In particular, when the thermoplastic resin contains reinforced fiber to have low flowability, or when the thermoplastic resin is thinly and widely applied, the injection pressure or the pressing pressure need to be set high. As a result, the metal plate is moved in the mold to cause the thermoplastic resin to leak into a joint region where a metal surface is exposed. Thus, it is difficult for the metal surface to be joined to a metal surface of another component.

The present invention has been made in view of such problems in the related art, and an object thereof is to provide a molding method, in which, in a component including a metal plate and a thermoplastic resin arranged on a surface on one side of the metal plate, a joint region where the surface and a metal surface of another component are joined to each other, especially a welding region, is reliably secured, without leakage of the thermoplastic resin.

Solution to Problem

As a result of extensive studies for achieving this object, the inventors of the present invention have found that the object can be achieved by fixing the metal plate by pressing the metal plate against a movable mold from a side of a fixed mold, and by exposing the metal plate out of the thermoplastic resin with use of a support portion of the fixed mold. In this way, the inventors have completed the present invention.

Specifically, the molding method according to the present invention is a method for molding a component including a metal plate and a thermoplastic resin arranged on a surface on one side of the metal plate, by using a mold including at least a movable mold and a fixed mold including a support portion.

More specifically, the molding method includes:
- an arranging step of arranging the premolded metal plate within the mold;
- a fixing step of fixing the metal plate by pressing the metal plate against the movable mold with use of the support portion;
- an injection step of injecting the thermoplastic resin into a cavity formed between the metal plate and the fixed mold, and
- a molding step including; closing the mold by moving or deforming the support portion while pressing the metal plate against the movable mold with the use of the support portion, pressing the thermoplastic resin with the metal plate and bringing the thermoplastic resin into close contact with the metal plate, and forming an exposed portion by exposing the metal plate out of the thermoplastic resin with use of the support portion.

In addition, the mold according to the present invention is a mold for molding a component including; a metal plate, and a thermoplastic resin arranged on a surface on one side of the metal plate.

Specifically, the mold includes at least a movable mold and a fixed mold;
- the fixed mold includes a support portion that advances toward and retracts from the movable mold so as to come into abutment against the metal plate and to press the metal plate against the movable mold;
- the fixed mold and the metal plate form a cavity; and
- an exposed portion is formed in the support portion by holding back the thermoplastic resin under a state in which the mold is open.

Advantageous Effects of Invention

According to the present invention, the metal plate is pressed against and fixed into the movable mold with use of the fixed mold including the support portion, and the metal plate is exposed out of the thermoplastic resin with use of the support portion. Thus, the molding method that enables to reliably secure, without the leakage of the thermoplastic resin, the joint region to the metal surface of the other component can be provided.

DESCRIPTION OF THE EMBODIMENTS

Figure 1:
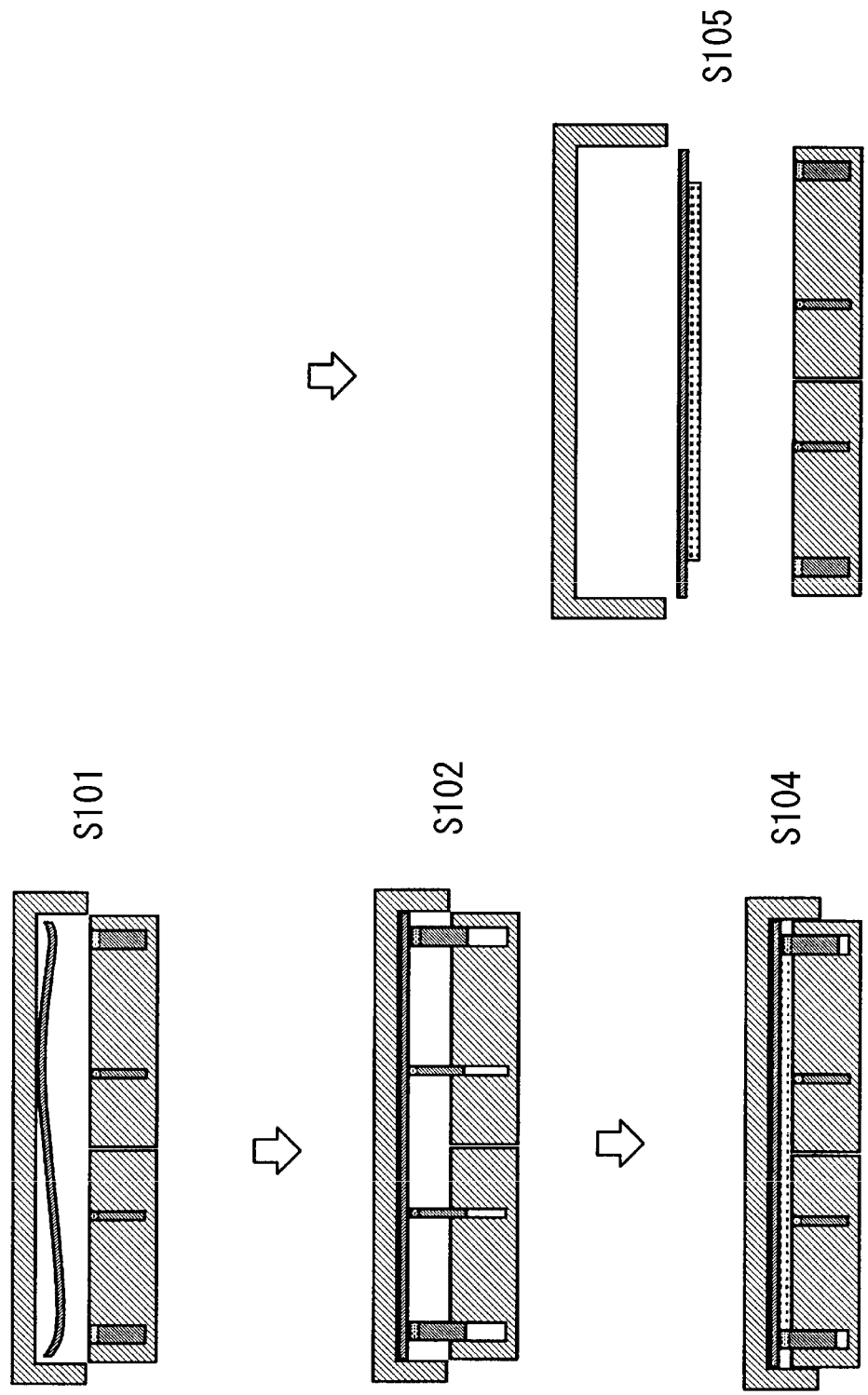
FIG. 1 is an explanatory view illustrating steps at a time when a molding method according to the present invention is applied to an injection molding method.

A molding method according to the present invention is described in detail. This molding method is a method of molding a component 1 including a metal plate 2 and a thermoplastic resin 3 arranged on a surface on one side of the metal plate. This method includes at least an arranging step, a fixing step, and a molding step.
An example of the steps of the molding method according to the present invention is illustrated in a schematic view of FIG. 1.

The arranging step, which is denoted by S101, is a step of arranging the premolded metal plate 2 within the mold 4. The metal plate 2 is molded into a predetermined shape, for example, by press molding so as to tightly fit to an inside of the mold 4 without gaps.

However, dimensional accuracy of the press molding is low in itself. In addition, when a thickness of the metal plate 2 is set to as small as, for example, 0.5 mm to 2.5 mm, rigidity of the metal plate 2 itself decreases. As a result, the metal plate 2 is liable to be deformed, and fails to tightly fit to the mold 4. In this way, the gaps are formed between the mold 4 and the metal plate 2.

Under a state in which the gaps are formed between the mold 4 and the metal plate 2 in this way, when the thermoplastic resin 3, which has been softened by heating, is applied, and then the thermoplastic resin 3 is held in close contact with the metal plate 2, the metal plate 2 is pressed by the thermoplastic resin 3, and is moved in the mold 4. Thus, the thermoplastic resin 3 cannot be applied to a desired position.

The present invention includes the fixing step, which is denoted by S102, and in which the metal plate 2 is pressed against the movable mold 5 with use of a support portion 7 of the fixed mold 6. Thus, the metal plate 2 is tightly fitted to the mold without gaps, and hence the metal plate 2 can be fixed.

Then, in the molding step, which is denoted by S104, the mold 4 is closed to form a cavity between the fixed mold 6 and the metal plate 2. Next, the thermoplastic resin 3 that has been softened by the heating is injected or pressed to be held in close contact with the metal plate 2.

At this time, a support portion 7a at a part where the thermoplastic resin 3 is not to be applied and the metal plate 2 is to be exposed holds back the thermoplastic resin 3 while in abutment against the metal plate 2. With this, an exposed portion 21 where the thermoplastic resin 3 is not applied is formed on a surface of the metal plate 2. Thus, the thermoplastic resin 3 can be applied only to a desired part, and a joint region where a metal surface of another component is joined can be formed without leakage of the thermoplastic resin 3.

In addition, a support portion 7b at a part where the thermoplastic resin 3 is applied, by merely fixing the metal plate 2 into the movable mold 5, is retracted into the fixed mold 6 after the thermoplastic resin 3 is supplied therearound.

Figure 4:
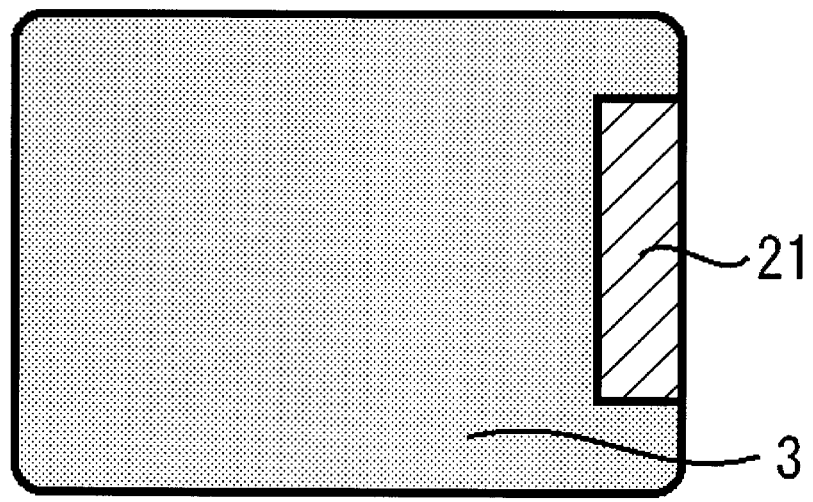
FIG. 4 is a plan view illustrating an example of a component including an exposed portion only on one side of a metal plate.

Then, the thermoplastic resin 3 flows to fill a mark of the support portion 7b. Thus, for example, even when the exposed portion 21 is formed only at an end portion on one side of the metal plate 2 as illustrated in FIG. 4, an entirety of the metal plate 2 can be uniformly pressed against and fixed into the movable mold 5.

Note that, even after the support portion 7b is retracted into the fixed mold 6, instead of the support portion 7b, the thermoplastic resin 3 continues pressing the metal plate 2 against the movable mold 5. Thus, the gaps are not formed between the metal plate 2 and the movable mold 5.

Figure 2:
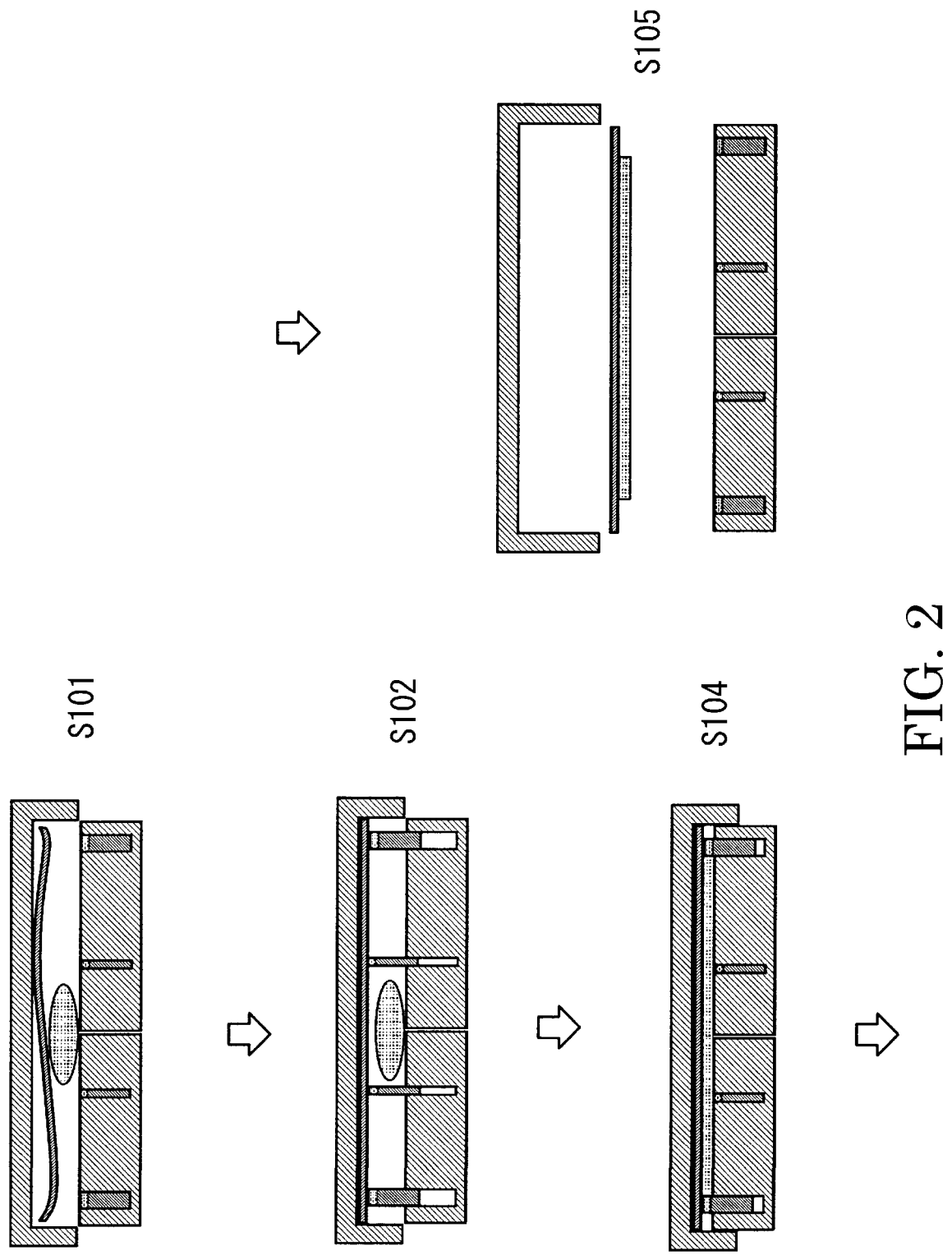
FIG. 2 is an explanatory view illustrating steps at a time when the molding method according to the present invention is applied to a press molding method.
Figure 3:
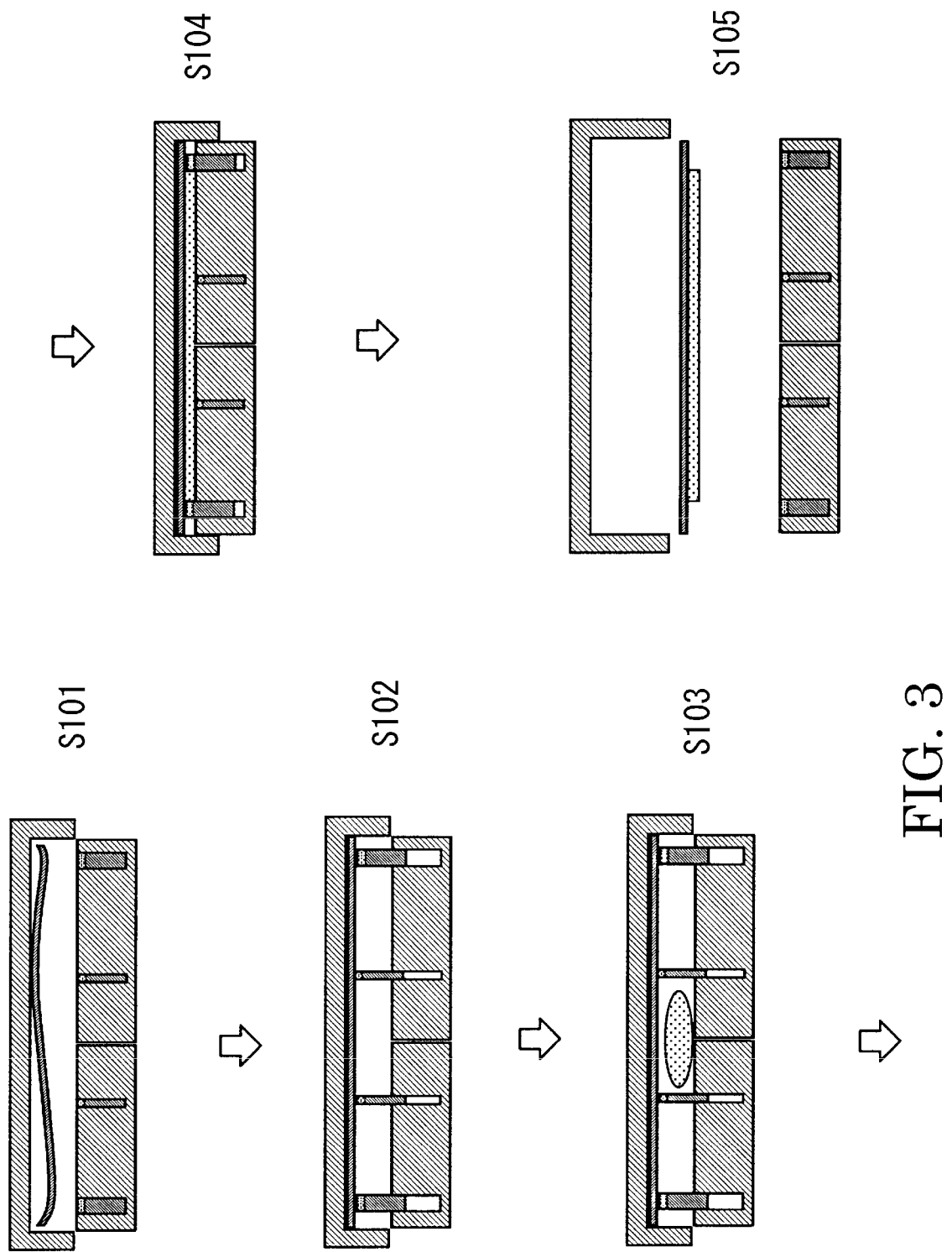
FIG. 3 is an explanatory view illustrating steps at a time when the molding method according to the present invention is applied to an injection-press molding method.

The above-described molding method is applicable not only to the injection molding method illustrated in FIG. 1, but also to the press molding method illustrated in FIG. 2, and to an injection-press molding method illustrated in FIG. 3.

The above-described molding method is preferably the injection-press molding method including an injection step S103 in which, as illustrated in FIG. 3, the softened thermoplastic resin is injected between the metal plate and the fixed mold after the fixing step and before the molding step.

Figure 5:
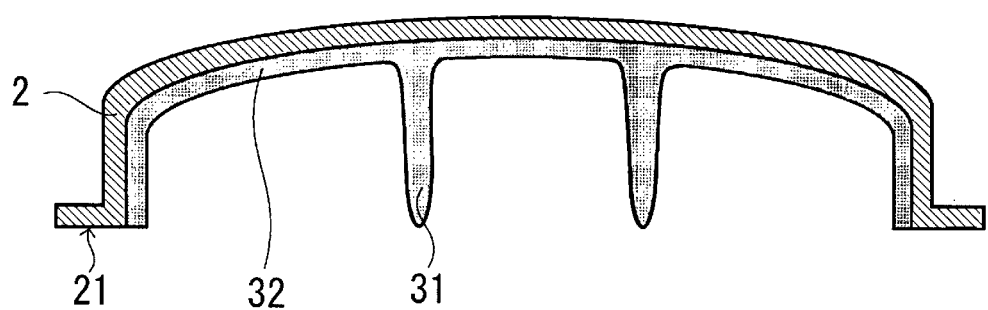
FIG. 5 is a cross-sectional view illustrating an example of a component, in which an entirety of a surface on one side of a liner layer is directly bonded to the metal plate.

For example, when the component 1 is molded to have a structure in which, as illustrated in FIG. 5, not only a reinforcing structure portion 31 such as a rib or a bead, but also a continuous liner layer 32 that covers the metal plate 2 is formed, and in which an entirety of a surface on one side of this liner layer 32 is directly bonded to the metal plate 2, flowability of the thermoplastic resin 3 need to be set high so that the thermoplastic resin 3 is thinly spread.

When the component 1 having such a structure is molded by the injection molding, that is, when the thermoplastic resin 3 is injected in the molding step S104 so that the thermoplastic resin 3 is held in close contact with the metal plate 2 as illustrated in FIG. 1, the heating cannot be performed at a temperature higher than a decomposition temperature of the thermoplastic resin 3. Thus, the increase in flowability is limited.

In addition, when the thermoplastic resin 3 contains reinforced fiber such as carbon fiber or glass fiber, the flowability decreases, and hence it is difficult to mold the component 1 into the above-described shape.

In addition, when the component 1 is molded by the press molding, a lump of the thermoplastic resin 3 is set together with the metal plate 2 in the mold 4 in the arrangement step S101 illustrated in FIG. 2, and then pressed. Thus, the thermoplastic resin 3 cannot be set in the mold 4 unless the flowability is reduced to an extent that the thermoplastic resin 3 in the lump form is lifted up.

Thus, in the press molding, it is difficult to increase the flowability of the thermoplastic resin 3 in itself, and in addition, when the flowability is reduced to the extent that the thermoplastic resin 3 in the lump form is lifted up, the thermoplastic resin 3 is unlikely to enter minute protrusions and recesses of the surface of the metal plate 2. As a result, microscopic sticking properties of the thermoplastic resin 3 and the metal plate 2 decrease to cause a decrease in bonding strength.

The injection-press molding method includes the injection step illustrated in FIG. 3, which is denoted by S103. In this step, the mold 4 is slightly opened to form a cavity that has a thickness larger than a thickness of the liner layer 32 of a desired shape after molding. In this state, the thermoplastic resin 3 is injected into the cavity from a side of the fixed mold 6. Then, while moving the support portion 7 into the fixed mold 6, the mold 4 is fully closed to form a cavity that has the thickness of the liner layer 32 of a desired shape after molding between the fixed mold 6 and the metal plate 2. With this, the injected thermoplastic resin 3 is pressed and held in close contact with the metal plate 2, and the thermoplastic resin 7 is held back by the support portion 7a so that the metal plate 2 is exposed. In this way, the exposed portion is formed.

Thus, in the injection-press molding method, the high flowability of the injected thermoplastic resin 3 and pressing pressure work together. With this, the liner layer 32 can be formed into the wide and thin shape, and the bonding strength of the thermoplastic resin 3 and the metal plate 2 can be increased.

However, in the injection-press molding method, as described above, the thermoplastic resin 3 is injected under the state in which the mold 4 is slightly opened. Thus, the metal plate 2 cannot be fixed to the mold 4, and in particular, the metal plate 2 is liable to be moved or deformed.

In the present invention, by the fixing step S102, the metal plate 2 is fixed to the movable mold 5. Thus, even in the injection-press molding method in which the thermoplastic resin 3 is injected under the state in which the mold 4 is opened, the metal plate 2 is not moved by pressure of the injection, and the thermoplastic resin 3 can be applied to the desired part. In this way, without the leakage of the thermoplastic resin 3, the exposed portion 21 where the thermoplastic resin 3 is not applied can be formed on the surface of the metal plate 2.

The fixing step S102 preferably includes a process of bringing the metal plate 2 into close contact with the movable mold 5 by suction or magnetism. By using both the pressing with the support portion 7 and the suction or the magnetism, the entirety of the surface of the metal plate 2 can be held in close contact with the movable mold 5. With this, dimensional accuracy of the component 1 is increased.

The molding step S104 preferably includes a process of increasing, as the mold 4 is closed, force with which the support portion 7 presses the metal plate 2 against the movable mold 5.

When the thermoplastic resin 3 is flattened as the mold 4 is closed, stress to be applied from the thermoplastic resin 3 to the support portion 7a increases. As a result, the thermoplastic resin 3 is liable to leak from the part where the support portion 7a and the metal plate 2 come into abutment against each other.

By increasing, as the mold 4 is closed, the force with which the support portion 7a presses the metal plate 2, repulsive force of the pressed thermoplastic resin 3 can be counterbalanced. With this, the leakage of the thermoplastic resin 3 can be prevented.

The pressing force may be controlled on the basis of feedback from a pressure sensor provided to the support portion 7.

The molding method preferably includes a depressurization step of depressurizing the cavity after the fixing step S102. By discharging gas in the cavity to depressurize the cavity, resistance of the gas in injecting the thermoplastic resin 3 is reduced. With this, the thermoplastic resin 3 is easily charged to increase moldability. As a result, formation of voids in the component is prevented to increase strength of the component.

As the depressurization of the cavity, the cavity may be directly depressurized by providing, to the fixed mold 6, an exhaust passage that communicates with the cavity, or the cavity may be depressurized by covering an entirety of the mold 4 with a chamber and depressurizing an inside of the chamber through a gap in the mold 4.

The molding method preferably includes a heating step of heating at least a peripheral portion of the metal plate 2 before the molding step S104.

During molding, generally, the thermoplastic resin 3 flows from a central portion of the metal plate 2 toward the peripheral portion of the same. Thus, in the peripheral portion, the thermoplastic resin 3 is liable to be cooled to decrease in its flowability. By heating the peripheral portion of the metal plate 2, the flowability of the thermoplastic resin 3 is increased so that the thermoplastic resin 3 is likely to spread to the peripheral portion. As a result, the moldability is increased.

In addition, when the surface of the metal plate 2 is roughened, the thermoplastic resin 3 enters the protrusions and the recesses of the surface of the metal plate. As a result, the bonding strength is increased.

The metal plate 2 may be heated via the movable mold 5 or the support portion 7 of the fixed mold 6, or may be preheated before the arranging step.

In addition, the molding step S104 preferably includes a process of varying a speed of closing the mold 4. By varying the speed of closing the mold 4, molding can be performed in accordance with the flowability of the thermoplastic resin 3 or in conformity with shapes of the component. As a result, the moldability is increased.

Then, when the molding is completed, in a mold opening step S105, the mold 4 is opened to take out the component 1.

As the metal plate 2, there may be used, for example, not only metal sheets made of aluminum, iron, stainless steel, copper, titanium, magnesium, brass, and the like, but also metal sheets plated with these metals.

The surface of the metal plate 2 is preferably roughened by chemical etching. The chemical etching such as immersion in aqueous solution of ammonia, hydrazine, and/or a water-soluble amine compound is different from mechanical surface-roughening treatment in that a hole having an inner diameter larger than its opening diameter is formed to produce anchoring effect by which the thermoplastic resin 3 and the metal plate 2 can be firmly bonded to each other.

In addition, as the thermoplastic resin 3, there may be used thermoplastic resins known in the related art, such as nylon. The thermoplastic resin 3 may contain the reinforced fiber, such as carbon fiber or glass fiber.

Now, the mold according to the present invention is described.

Figure 6:
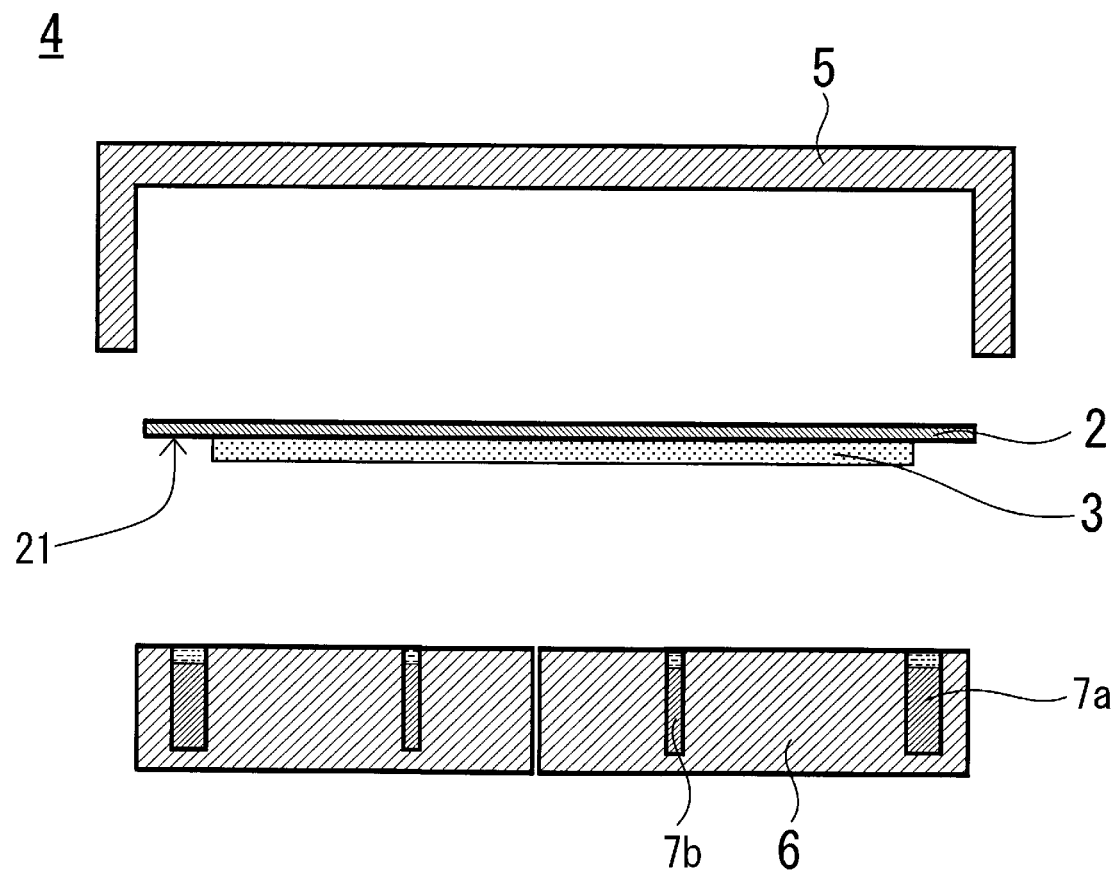
FIG. 6 is a schematic view illustrating an example of a mold according to the present invention.

The mold according to the present invention is illustrated in a schematic view of FIG. 6. The mold 4 is a mold for molding a component, including the metal plate 2, and the thermoplastic resin 3 arranged on the surface on one side of the metal plate 2, the mold being used in the above-described molding method, and including at least the movable mold 5 and the fixed mold 6 including the support portion 7.

Figure 7:
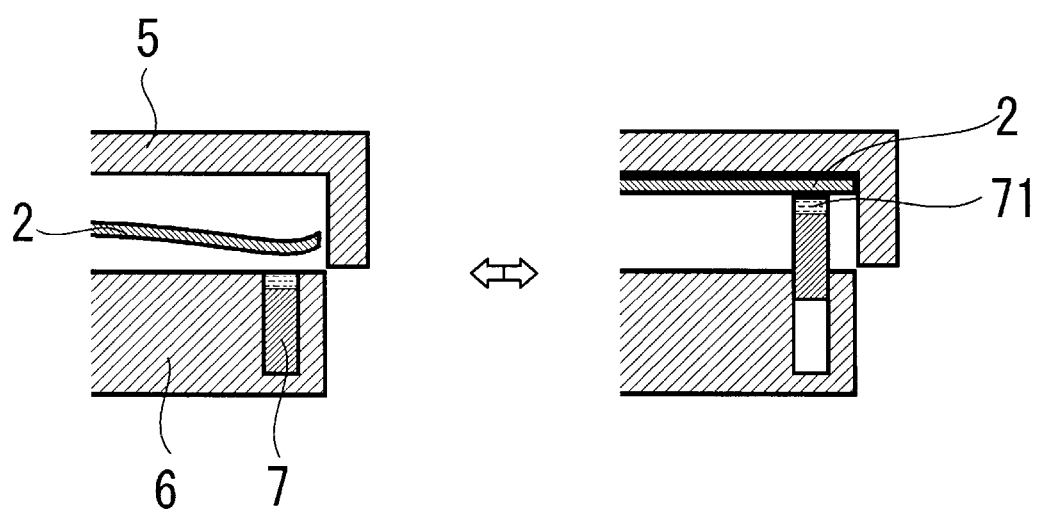
FIG. 7 is an explanatory view illustrating a state in which a support portion of a fixed mold advances and retracts to press the metal plate against the fixed mold.

As illustrated in FIG. 7, the support portion 7 of the fixed mold 6 advances toward and retracts from the movable mold 5 so as to press the metal plate 2 against the movable mold 5. With this, the metal plate 2 is sandwiched and fixed between the support portion 7 and the movable mold 5.

Figure 8:
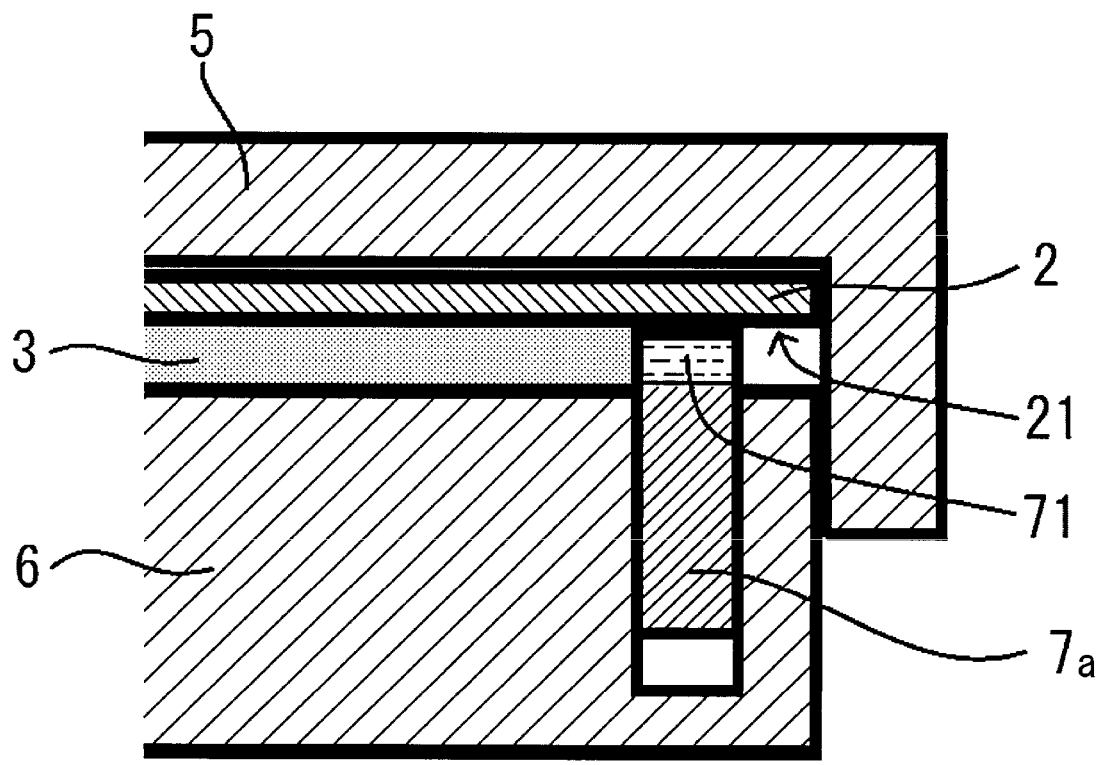
FIG. 8 is an explanatory view illustrating a state in which the support portion forms the exposed portion by exposing the metal plate out of a thermoplastic resin.

The cavity in which the thermoplastic resin 3 is molded is formed between the fixed mold 6 and the metal plate 2. As illustrated in FIG. 8, the support portion 7a comes into abutment against the metal plate 2 so as to hold back the thermoplastic resin 3. Thus, the thermoplastic resin 3 is not applied to the part against which the support portion 7a is held in abutment, and the exposed portion 21 is formed.

Figure 9:
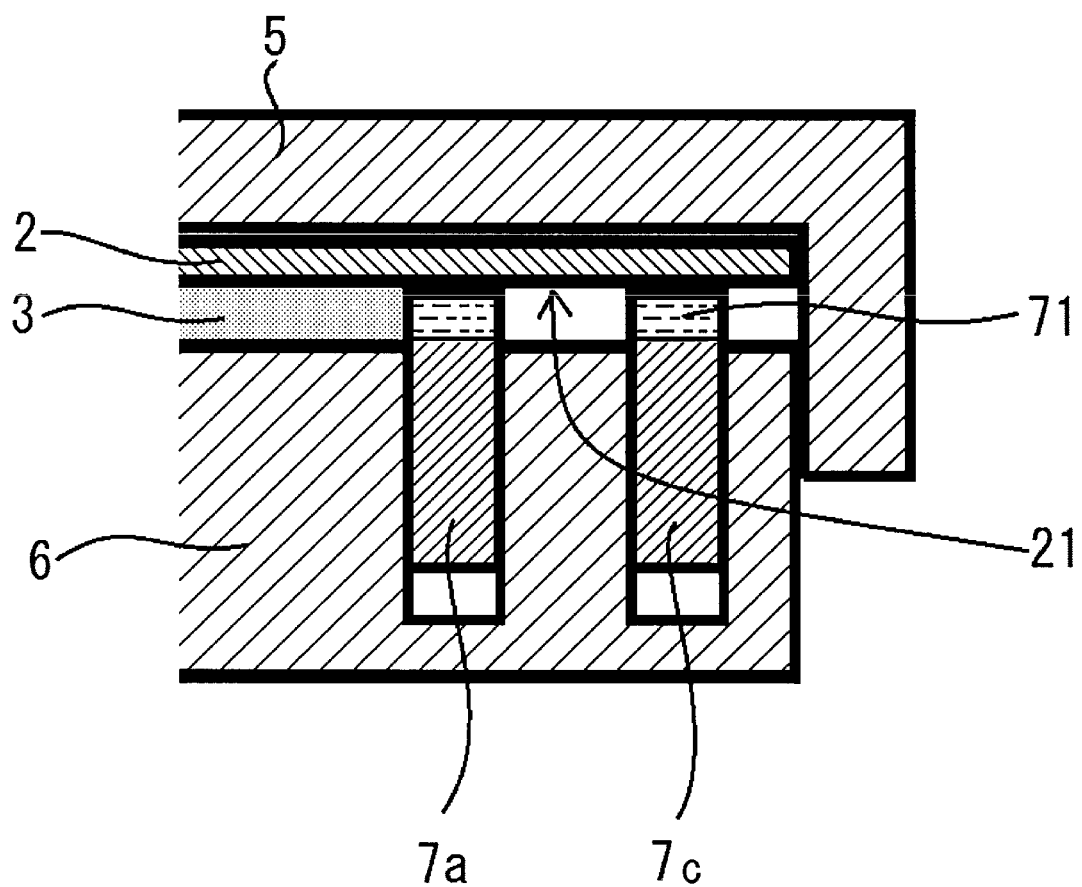
FIG. 9 is a view illustrating an example of a mold including double support portions.

As illustrated in FIG. 9, the fixed mold 6 preferably further includes an outer support portion 7c on an outer side of the support portion 7a that forms the cavity together with the metal plate 2.

By respectively providing the support portion 7a for holding back the thermoplastic resin 3 and for preventing the leakage of the same, and the outer support portion 7c for fixing the metal plate 2, a degree of freedom in design is increased. As a result, the moldability is increased.

The force with which the support portion 7a presses the metal plate 2 against the movable mold 5 is preferably variable. By increasing, as the mold 4 is closed, the force with which the support portion 7 presses the metal plate 2, the repulsive force of the pressed thermoplastic resin 3 can be counterbalanced. With this, the leakage can be prevented.

As illustrated in FIGS. 8 and 9, the support portion 7 preferably includes an elastomer 71 at the abutment portion where the support portion 7 abuts against the metal plate 2. By providing the elastomer 71 at the abutment portion, damage to the metal plate 2 is prevented. In addition, even when the surface of the metal plate 2 includes the protrusions and the recesses, the support portion 7a can be held in close contact with the metal plate 2 to reliably fix the metal plate 2. With this, the leakage of the thermoplastic resin 3 can be prevented.

Although the support portion 7 may include the elastomer 71 at the abutment portion in a metal slide core as illustrated in FIGS. 8 and 9, when an entirety of the elastomer 71 is formed of a solid or a hollow elastomer, cost can be reduced.

Figure 10:
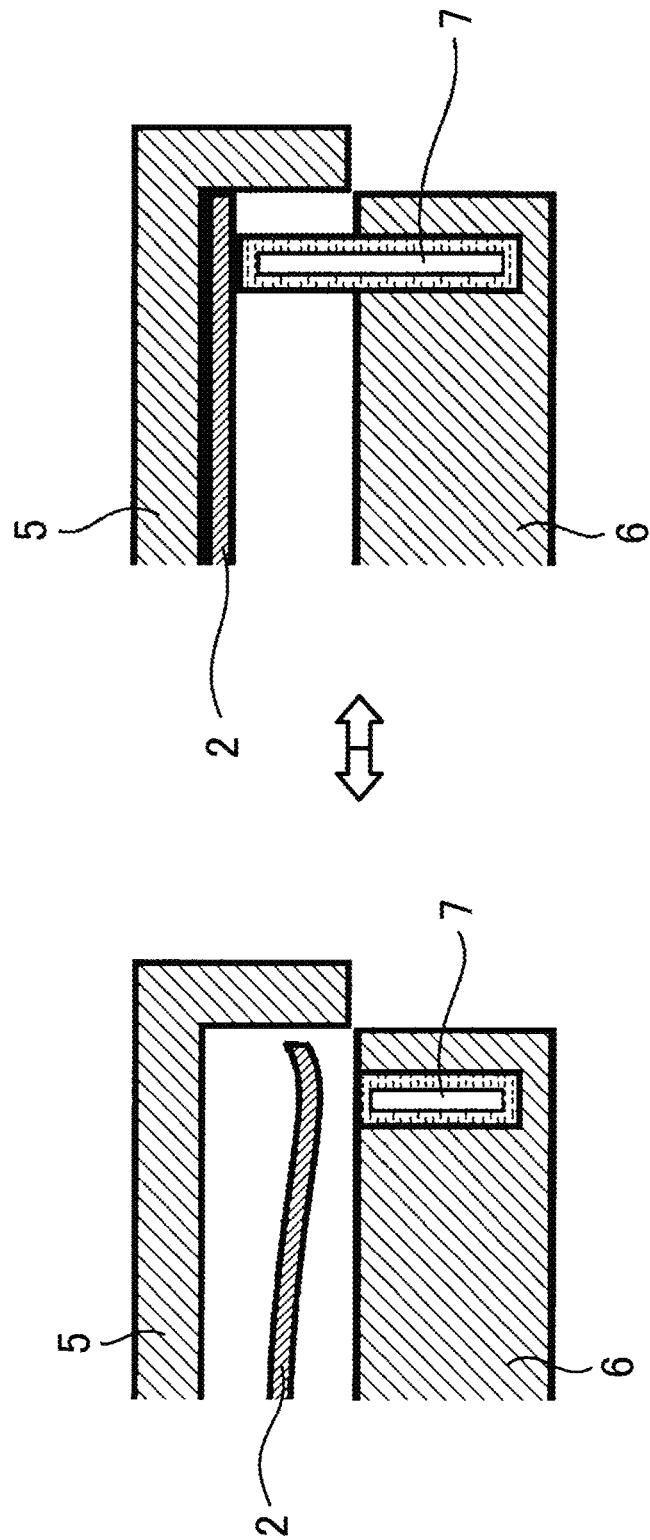
FIG. 10 is an explanatory view illustrating a state in which the support portion that advances and retracts is made of an elastomer having a hollow structure.

In addition, when the support portion 7 is formed of the elastomer 71 with a hollow structure, as illustrated in FIG. 10, air pressure in the hollow of the elastomer can be varied. Thus, abutment pressure in abutting against the metal plate 2 can be varied in accordance with a distance in which the support portion 7 advances toward and retracts from the movable mold 5. With this, even when the support portion 7 extends toward the movable mold 5, the abutment pressure does not decrease. Thus, the metal plate 2 can be firmly fixed.

As the elastomer, there may be used heat-resistant elastomers such as silicone rubber and fluororubber.

The movable mold 5 preferably includes at least one selected from the group consisting of a suction port, a suction cup, and an electromagnet.

By pressing with the support portion 7 of the fixed mold 6, and by pulling from a side of the movable mold 5, the entirety of the surface of the metal plate 2 can be held in close contact with the movable mold 5. With this, the dimensional accuracy of the component 1 is increased.

In addition, the fixed mold 6 preferably includes the exhaust passage that communicates with the cavity. By discharging gas in the cavity through the exhaust passage so as to depressurize the cavity, the resistance of the gas in injecting the thermoplastic resin 3 is reduced. With this, the thermoplastic resin 3 is easily charged to increase the moldability.

At least one of the movable mold 5 and the fixed mold 6 preferably includes a heating apparatus.

Generally, the thermoplastic resin flows from the central portion of the metal plate 2 toward the peripheral portion of the same. Thus, in the peripheral portion, the thermoplastic resin 3 is liable to be cooled to decrease in its flowability. By providing the heating apparatus at least at a part where the thermoplastic resin 3 is held in abutment against the peripheral portion of the metal plate 2 so as to heat the metal plate 2, the flowability of the thermoplastic resin 3 is increased. As a result, the moldability is increased.

The movable mold 5 or the fixed mold 6 preferably includes positioning guide pins for the metal plate 2. By aligning the positioning guide pins and positioning holes formed through the metal plate 2 with each other, the metal plate 2 can be arranged at a predetermined position in the mold 4. With this, productivity is increased.

As described above, by molding the component using a metal-resin composite by the molding method in which the mold 4 according to the present invention is used, the exposed portion 21 can be reliably formed without the leakage of the thermoplastic resin 3. As a result, the joint region to the metal surface of the other component can be secured.

Thus, the component 1 enables, via the exposed portion 21, welding such as spot welding, laser welding, brazing, and frictional heat welding, but also fastening of the metal surfaces with rivets or the like, and bonding of the metal surfaces with an adhesive or the like.

Figure 11:
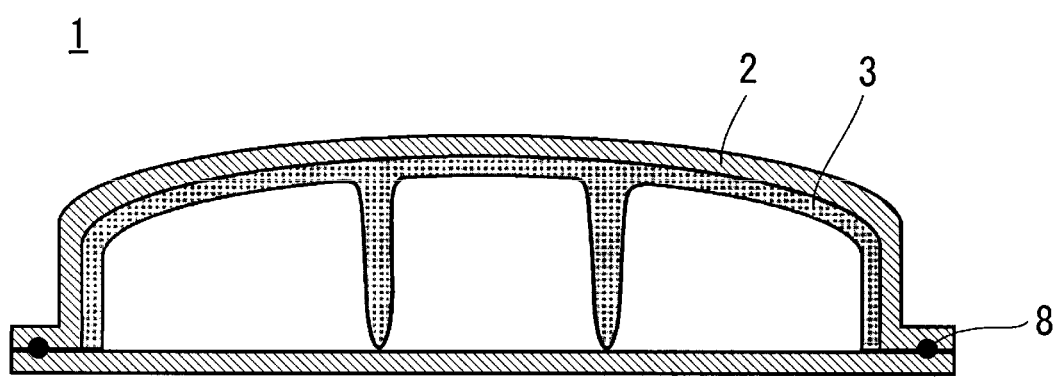
FIG. 11 is a view illustrating an example of a component to which a metal plate is welded and which has a hollow structure.

With this, for example, by joining another metal plate to the exposed portion 21, the component 1 to be produced can have a hollow structure as illustrated in FIG. 11, which is reduced in weight and increased in strength. More specifically, automotive components including not only frame members such as a body side panel, a rear fender, a dash panel, but also a door panel and a back-door panel can be produced.

REFERENCE SIGNS LIST

1 Component
2 Metal plate
21 Exposed portion
3 Thermoplastic resin
31 Reinforcing structure portion
32 Liner layer
4 Mold
5 Movable mold
6 Fixed mold
7(a, b) Support portion
7c Outer support portion
71 Elastomer
8 Weld

The invention claimed is:

1. A method of molding a component that includes a metal plate having a first surface and a second surface opposite the first surface, and a thermoplastic resin arranged on the first surface of the metal plate, the method comprising:
   providing a mold comprising:
      a movable mold, and
      a fixed mold that comprises a support portion;
   arranging the metal plate within the mold, wherein the metal plate is premolded;
   fixing the metal plate against the movable mold using the support portion;
   injecting an amount of the thermoplastic resin into a cavity formed between the metal plate and the fixed mold; and
   after injecting the amount of the thermoplastic resin, closing the mold by moving or deforming the support portion while pressing the second surface of the metal plate against the movable mold using the support portion, and pressing the amount of the thermoplastic resin with a first portion of the first surface of the metal plate, which is located inward of the support portion, so as to bring the amount of the thermoplastic resin into direct contact with the first portion of the first surface of the metal plate, while a second portion of the first surface of the metal plate, which is located outward of the support portion, remains unexposed to the amount of the thermoplastic resin due to the amount of the thermoplastic resin being blocked by the support portion, and while an entirety of the second surface of the metal plate remains unexposed to the amount of the thermoplastic resin.

2. The method of molding according to claim 1, wherein the fixing includes bringing the metal plate into direct contact with the movable mold by suction or magnetism.

3. The method of molding according to claim 1, wherein, as the mold is closed, a force with which the support portion presses the second surface of the metal plate against the movable mold is increased.

4. The method of molding according to claim 1, further comprising depressurizing the cavity after the fixing.

5. The method of molding according to claim 1, further comprising heating at least a peripheral portion of the metal plate before the injecting.

6. The method of molding according to claim 1, wherein the molding includes varying a speed of closing the mold.

7. The method of molding according to claim 2, wherein, as the mold is closed, a force with which the support portion presses the metal plate against the second surface of the movable mold is increased.

8. The method of molding according to claim 2, further comprising depressurizing the cavity after the fixing.

9. The method of molding according to claim 2, further comprising heating at least a peripheral portion of the metal plate before the injecting.

10. The method of molding according to claim 2, wherein the molding includes a process of varying a speed of closing the mold.

11. The method of molding according to claim 1, wherein:
    the support portion is an outer support portion,
    the fixed mold further comprises an inner support portion,
    in the step of fixing the metal plate, the metal plate is fixed against the movable mold by both the outer support portion and the inner support portion, and
    the method further comprises, after injecting the amount of the thermoplastic resin, retracting the inner support portion into the fixed mold, such that, when the amount of the thermoplastic resin is pressed with the first portion of the first surface of the metal plate, the amount of the thermoplastic resin flows to a region between the retracted inner support portion and the metal plate.

12. A method of molding a component that includes a plate having a first surface and a second surface opposite the first surface, and a resin arranged on the first surface of the plate, the method comprising:
    providing a mold comprising:
       a movable mold, and
       a fixed mold that comprises:
          a fixed mold body, and
          a support portion;
    arranging the plate within the mold, wherein the plate is premolded;
    fixing the plate against the movable mold by moving the support portion relative to the fixed mold body;
    injecting an amount of the resin into a cavity formed between the plate and the fixed mold body; and
    after injecting the amount of the resin, closing the mold by moving or deforming the support portion while pressing the second surface of the plate against the movable mold using the support portion, and pressing the amount of the resin with a first portion of the first surface of the plate, which is located inward of the support portion, so as to bring the amount of the resin into direct contact with the first portion of the first surface of the plate, while a second portion of the first surface of the plate, which is located outward of the support portion, remains unexposed to the amount of the resin due to the amount of the resin being blocked by the support portion, and while an entirety of the second surface of the plate remains unexposed to the amount of the resin.

* * * * *